UNITED STATES PATENT OFFICE.

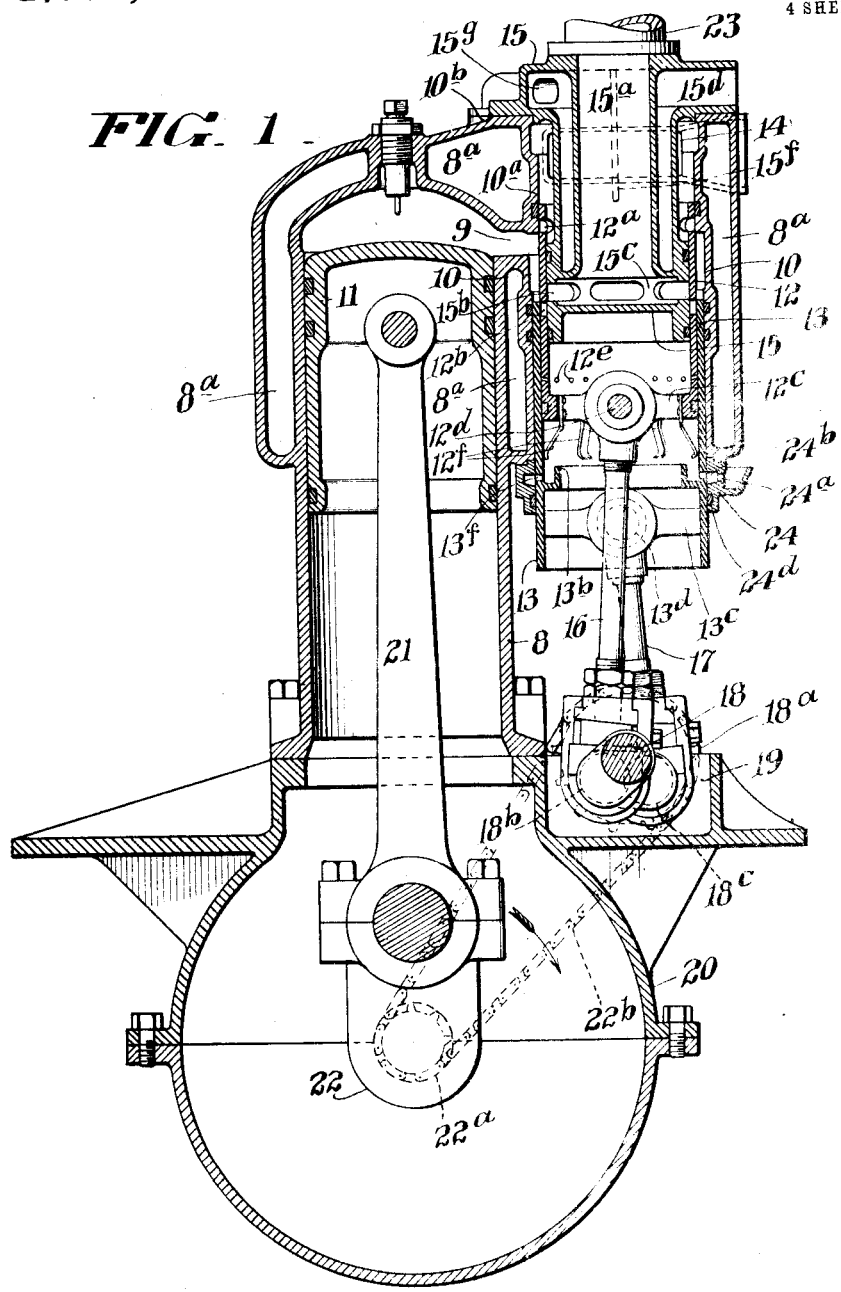

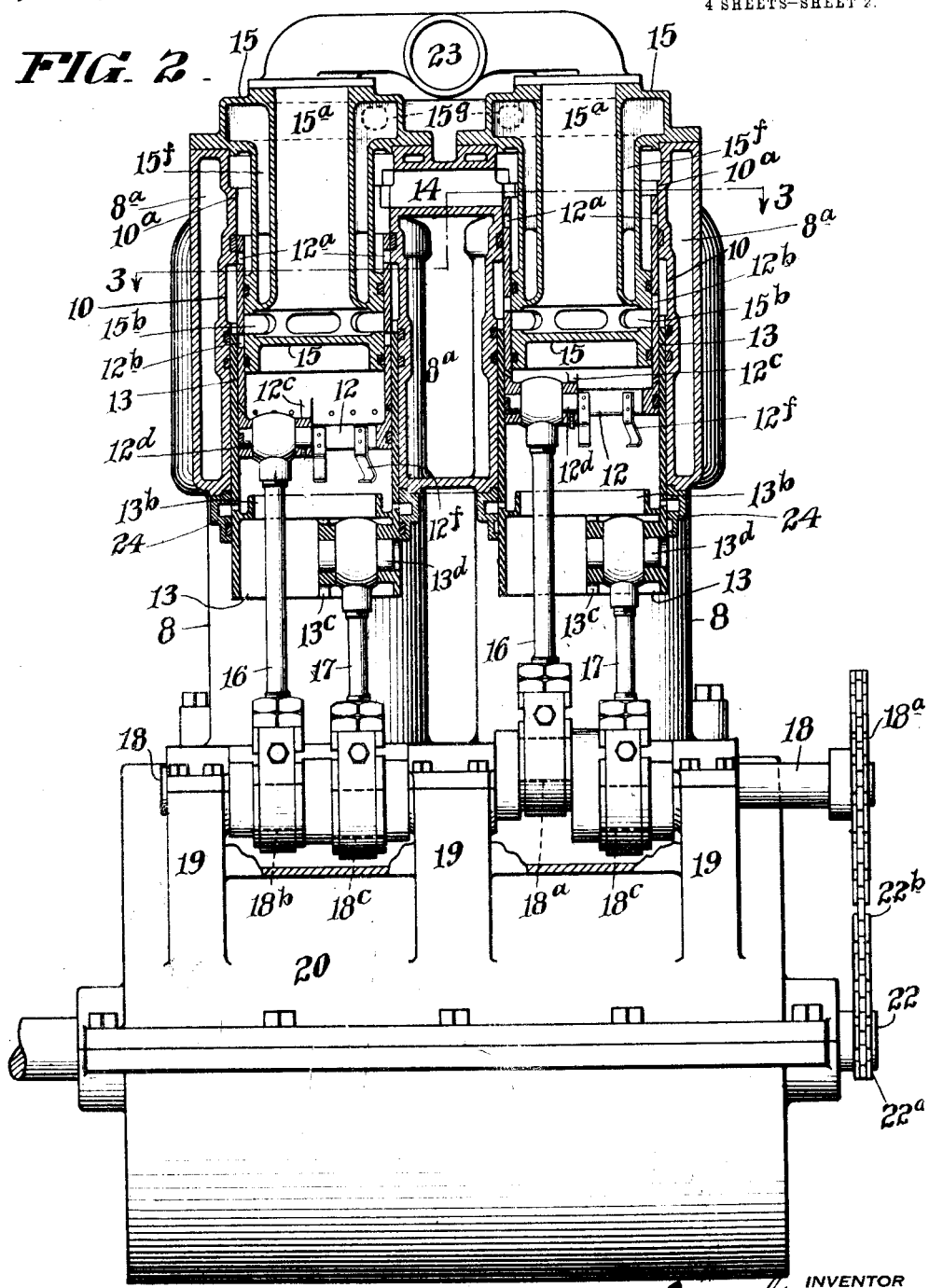

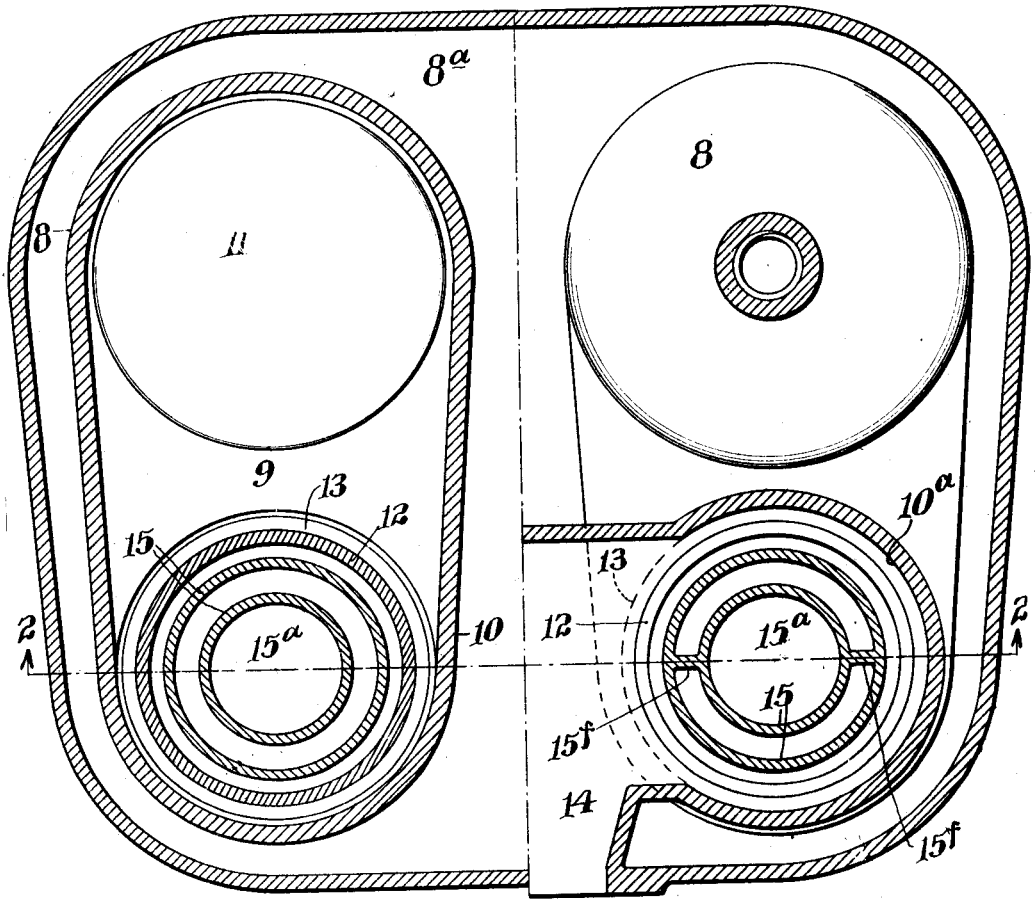

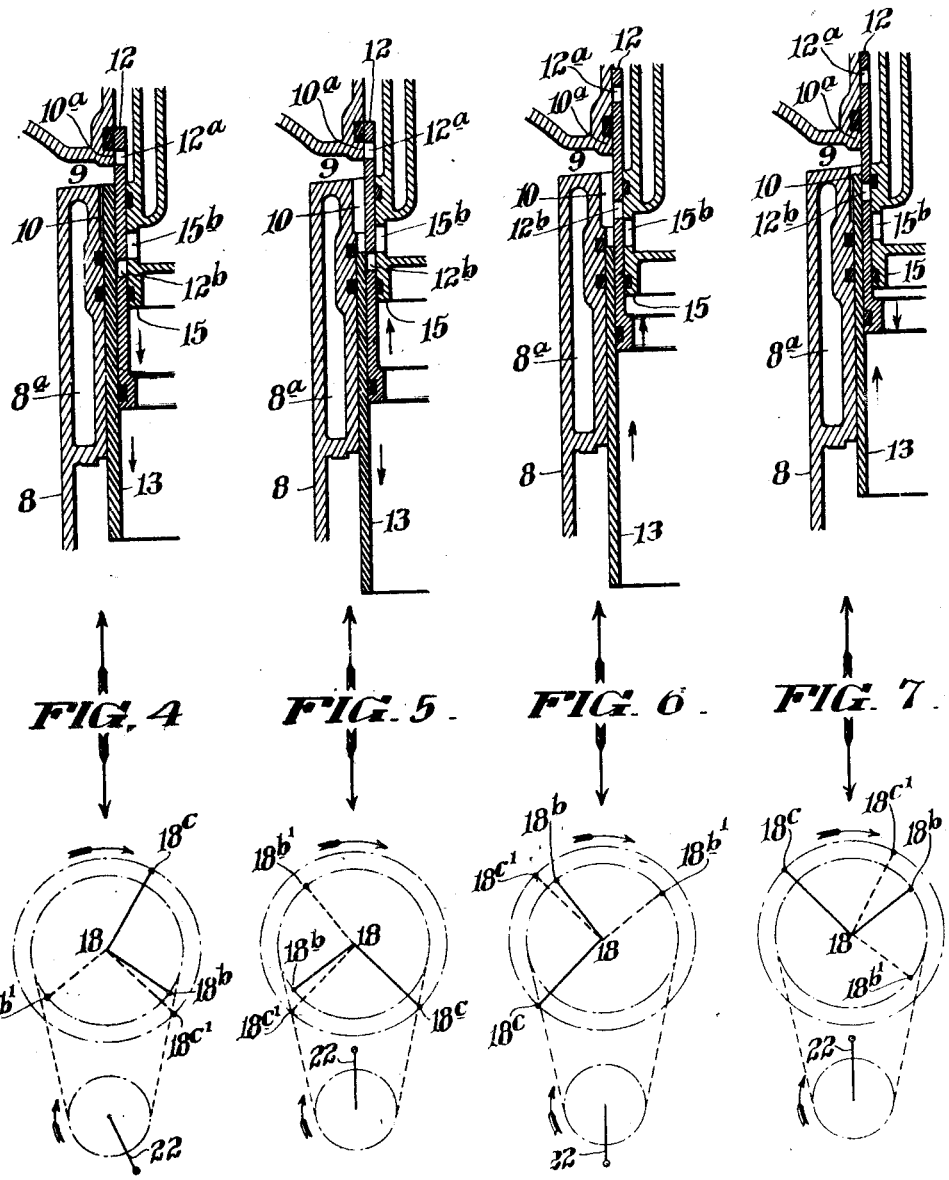

LODEWYK JAN RUTGER HOLST, OF LANSDOWNE, PENNSYLVANIA, ASSIGNOR OF ONE-THIRD TO HENRY S. WILLIAMS AND ONE-THIRD TO MORRIS EARLE, BOTH OF PHILADELPHIA, PENNSYLVANIA.

VALVE FOR INTERNAL-COMBUSTION ENGINES.

1,052,339.   Specification of Letters Patent.   Patented Feb. 4, 1913.

Application filed February 13, 1912. Serial No. 677,382.

*To all whom it may concern:*

Be it known that I, LODEWYK JAN RUTGER HOLST, a citizen of the United States, residing at Lansdowne, in the county of Delaware and State of Pennsylvania, have invented certain new and useful Improvements in Valves for Internal-Combustion Engines, of which the following is a specification.

The principal object of my invention is to provide a type of valve which will perform the correct regulation of the periods of fuel-admission and exhaust and control their duration with unvarying accuracy, whatever the speed may be of the engine.

To attain the above defined ends, it is necessary that the valves be positively driven; and that the beginning as well as the ending of the periods of admission and exhaust be controlled by the action of a movable port, with relation to fixed ports, so that one movable element shall perform all the before-mentioned functions.

In the mechanical devices adapted to attain such results, use is made of two movable tubular members, concentric with each other and telescoping in each other, the outer member serving exclusively the purpose of preventing the second opening of either the suction or exhaust port within the same cycle of operation of the engine.

For the better understanding of my present invention, reference is made to the annexed drawings, in connection with the following description; in which drawings—

Figure 1, is a view in elevation and cross-section through the cylinder and valve-chest of an engine, fitted with my tubular valves as to main features thereof. Fig. 2, is a view in elevation and transverse-section on the line 2—2 of Fig. 3. Fig. 3, is a horizontal cross-sectional view on the line 3—3 of Fig. 2. Figs. 4, 5, 6 and 7, are diagrammatic sections, showing the relative positions of the fixed ports and the movable ports at the beginning of each of the four phases of one cycle of operation, and the corresponding positions of the cranks or eccentrics on the half-time shaft.

In the drawings, corresponding parts have been indicated by the same reference letters and numerals.

Referring now to the drawings, in Fig. 1, the cylinder-casting 8, is provided with a port-opening 9, by means of which the interior space of the cylinder above the piston 11, is in communication with an annular space limited by the inner-wall of the valve-chest 10, and the outer surface of the tubular members 12 and 13. These tubular members 12 and 13, are adapted to telescope in each other and to be reciprocated by means of mechanism hereinafter to be fully described. The inner tubular member 12, fits accurately in the upper-section 10ª, of the valve-chest 10, located immediately above the cylinder port 9, for the purpose of separating the combustion space in the cylinder from the exhaust-outlet 14, whenever the exhaust-ports 12ª, in the tubular member 12, do not register with the cylinder-port 9. The inner surface of the tubular member 12, fits snugly around the lower part of the hollow central guide-piece 15, which itself is rigidly attached to the upper face 10ᵇ, of the valve-chest. The outer-diameter of the guide-piece 15, is somewhat reduced beginning at a point approximately in line with the lower edge of the cylinder-port 9, so that when the port-holes 12ª, register with the port 9, a sufficiently large annular space inside the tubular member 12, is provided for the prompt efflux of the exhaust gases toward the exhaust-opening 14.

The central guide-piece 15, is closed at the bottom, but its cylindrical wall is provided with a series of slots 15ᵇ, reaching entirely around, save for the short bridge-pieces 15ᶜ, retaining the bottom to the upper part. These slots 15ᵇ, form the stationary suction-ports, and are connected through the tubular upper-end 15ª, with the suction-manifold 23, so that when the suction-ports 12ᵇ, in the inner tubular member 12, register with the ports 15ᵇ, the explosive mixture will be drawn into the cylinder by way of the annular opening in the valve-chest 10, below the cylinder-port 9, provided, however, that at the same time the outer annular member 13, is placed low enough not to cover the ports 12ᵇ, of the inner tubular member 12.

The distance between the two sets of ports 12ª and 12ᵇ, in the inner tubular member 12, is preferably regulated so, that at the same time that the exhaust-ports 12ª, cease to register with the cylinder-port 9, the suction-ports 12ᵇ, come in register with the suction-ports 15ᵇ, while the distance between the cylinder-port 9, and the suction-ports 15ᵇ, is established with due regard to the travel of the tubular member 12, in order that the ports 12ᵇ, will not pass beyond the line of reduction in the diameter of the central guide-piece 15, thereby preventing them from acting also as exhaust-ports.

The lower end of the valve-chest 10, is open and permits the outer tubular member 13, to freely pass through. The member 13, is operated by means of the connector 17, driven by an eccentric disk or crank 18ᶜ, on the halftime shaft 18. The eccentricity of the crank 18ᶜ, together with its angle of advance over the crank 18ᵇ, and the length of the connector 17, and of the member 13, are so inter-regulated that when the suction stroke begins, the upper edge of the member 13, is in line with, or slightly below, the lower edge of the ports 15ᵇ, as clearly shown in Fig. 5. During the suction stroke the crank 18ᶜ, moves through an arc of 90°, disposed symmetrically with regard to the vertical center line of the valve-mechanism, consequently the upper edge of the member 13, will remain below the lower edge of the ports 15ᵇ, during the entire suction stroke, thus preventing any participation of the member 13, in the regulation of the suction period, which is determined exclusively, by the added height of the ports 12ᵇ and 15ᵇ, which total height is equal to the movement of the inner member 12, when its driving eccentric 18ᵇ, moves from the drawn position of the eccentric 18ᵇ, in Fig. 5, to a point 18ᵇ′, 90° farther, as dotted in Fig. 5, which point corresponds with the drawn position of the eccentric 18ᵇ, in Fig. 6, representing the beginning of the compression stroke. During this stroke the eccentric 18ᵇ, driving the member 12, passes through its upper dead-center, thereby keeping all ports closed and the eccentric 18ᶜ, now drives the member 13, upwardly, thereby completely overlapping the suction-ports 15ᵇ, and finally also covering the suction-ports 12ᵇ, so that when the explosion takes place the various valve gear members will have assumed the relative positions shown in drawn lines in Fig. 7. This figure shows that shortly after the beginning of the outward movement of the piston 11, on the working stroke, the member 13, will reach its uppermost position, thereby protecting the suction and exhaust-valve member 12, from the heat of the explosion, and at the same time preventing the expanding gases finding a way to the suction piping when the suction-ports 12ᵇ, on the downward stroke of the member 12, pass the ports 15ᵇ, at the end of the explosion stroke, when the ports 12ᵃ, come in register with the cylinder-port 9, for the purpose of giving exhaust to the combustion product. The member 13, is sufficiently advanced in its downward stroke, as shown in Fig. 4, to prevent any interference whatever with the exhaust period, and it will thus be seen that the inner member 12, alone, regulates the beginning and the ending of the suction period, and of the exhaust period, while the outer member 13, has prevented the suction-ports establishing connection between the explosive chamber and the fuel supply during the explosive stroke of the piston.

As the timing of the suction and exhaust periods is thus produced by the passage of two sets of ports in the same movable member, across a set of immovable ports, the accuracy of the timing when once established, cannot be disturbed, no two movable members partaking in this regulation.

In Fig. 2, is shown the arrangement of the exhaust openings 14, in case the present invention is applied to engines with cylinders cast in multiple-units.

The connecting rods 16 and 17, respectively, operating the members 12 and 13, engage the wrist-pins 12ᵈ and 13ᵈ, arranged respectively to the right and to the left of the center of their respective members. To lubricate these members the following provision is made. The ring 24, contains an oil-chamber 24ᵇ, surrounding the outer face of the tubular member 13. Oil is poured into this chamber through the holes 24ᵃ, and a properly fitting spring or packing 24ᵈ, prevents the oil running out, downwardly. The interior of the member 13, carries an annular oil pocket 13ᵇ, into which the oil enters through a number of holes 13ᶠ, drilled around the circumference thereof. The two tubular members 12 and 13, travel for a while downwardly and upwardly at their minimum distance during which periods the spring fingers 12ᶠ, fastened to the lower end of the inner member 12, dip into the oil chamber 13ᵇ, and later smear the oil against the inner face of the member 13, when the two do not further travel, in unison. In such manner the requisite supply of lubricant is applied to the telescopic members 12 and 13. The first mentioned member is also provided with a series of small holes 12ᵉ, through which a supply of oil is finally brought to and distributed around its inner surface. Furthermore, these movable tubular members are kept in perfect working order by an efficient system of water-cooling. The outer member 13, is surrounded by the jacket 8ᵃ, which extends all around the valve-chest 10, while the inner member 12, is cooled partly by the same jacket and partly by the jacket 15ᵈ, formed between the two concentric walls of the upper part of the guide-piece 15. The cooling water entering at the opening 15ᵈ, is deflected downward by the baffles 15ᶠ, as illustrated in Figs. 1 and 3, and passes through the opening 15ᵍ, toward the cylinder-jacket. This insures the coolest water to circulate in the jacket 15$^d$, cooling the charge when drawn in, and also cooling the exhaust-gases reducing thereby their velocity and the noise of their escape, contributing greatly to the efficiency of the muffler and the silence of the engine.

Having thus described the nature and objects of my invention and the manner in which the same is to be performed, what I claim as new and desire to secure by Letters Patent is:—

1. In an internal combustion engine, a cylinder, a valve-chest of circular cross-section at one side of said cylinder and in communication therewith through a single port, said valve-chest being provided with an exhaust opening communicating with an annular chamber formed between the inner wall of said valve-chest and the outer wall of a sleeve-like guide piece, said guide-piece closed at its lower end, supported concentrically within said valve-chest, and said guide-piece having its open upper end connected with the fuel supply pipe and having in its cylindrical wall near the closed lower end a series of slots forming an annular suction opening.

2. In internal combustion engines, a cylinder-casting carrying a valve-chest of circular cross-section and connected therewith by one port-opening, said valve-chest rigidly supporting concentrically a guide-piece of circular cross-section closed at the bottom and leaving an annular space between the outer wall of said guide-piece and the inner wall of said valve-chest, a pair of telescoping movable tubular members, the outer one being blind and fitting closely against the inner wall of said valve-chest, the inner tubular movable member having two sets of annular apertures, and said member fitting closely the outer wall of said central guide-piece, the apertures of said movable inner tubular member being adapted to successively register respectively, with the port in the cylinder-casting and with the annular apertures in the central guide-piece.

3. In internal combustion engines, a cylinder-casting carrying a valve-chest of circular cross-section and connected to said valve-chest by one port-opening, said valve-chest having in its cylindrical wall an opening connecting with the exhaust piping of the engine, said valve-chest rigidly supporting a hollow guide-piece of circular cross-section, said guide-piece connected at one end with the fuel supply of the engine and having near its closed opposite end a number of openings forming one circular inlet-port, a pair of telescoping movable members adapted to reciprocate in the annular space formed by the inner wall of said valve-chest and the outer wall of said guide-piece, the outer one of said movable members being blind and the inner one of said movable members being provided with two sets of openings, so spaced that one set will by the reciprocating movement of the inner member regulate the beginning and the ending of the exhaust-period, and the other set regulate the beginning and the ending of the suction-period, the reciprocating movement of the outer telescoping member causing the suction-openings in the inner telescoping member to be closed on their second passage across the annular opening of the guide-piece within the same cycle of operations of the engine.

4. In internal combustion engines, a cylinder-casting carrying a valve-chest of circular cross-section and connected therewith by one port-opening, a concentric guide-piece of circular cross-section and closed at the bottom, rigidly supported inside of said valve-seat and a pair of reciprocating telescoping members, one of said members being provided with two sets of ports spaced so that one set of said ports will cause the beginning and ending of the exhaust period by the reciprocating movement imparted to said member and the second set of ports in said member causing the beginning and the ending of the suction period by the continuance of the reciprocating movement imparted to said member.

5. In internal combustion engines, the combination of a cylindrical valve-chest with a cylindrical concentric guide-piece and two telescoping tubular members movable in the space formed between the inner surface of the valve-chest and the outer surface of said guide-piece, the outer telescoping member arranged to project at all times in its travel below the lower edge of the inner telescoping member, the inner surface of said projecting part of the outside telescoping member provided with an annular oil-chamber, radial perforations in which are adapted to register with a stationary oil-chamber carried by the lower end of said valve-chest and spring fingers connected with the inner telescoping member to dip into the oil-chamber of the outer telescoping member, substantially as and for the purposes described.

In witness whereof, I have hereunto set my signature in the presence of the two subscribing witnesses hereto.

LODEWYK JAN RUTGER HOLST.

Witnesses:
THOMAS M. SMITH,
HELEN F. MILLER.